(12) United States Patent
Guzikowski (10) Patent No.: US 6,322,348 B1
(45) Date of Patent: Nov. 27, 2001

(54) ROTATIONAL MOLD AUTOMATED CLAMPING SYSTEM

(75) Inventor: Gary R. Guzikowski, Franklin, WI (US)

(73) Assignee: Norstar Aluminum Molds, Inc., Cedarburg, WI (US)

( * ) Notice: Subject to any disclaimer, the term of this patent is extended or adjusted under 35 U.S.C. 154(b) by 0 days.

(21) Appl. No.: 09/420,101

(22) Filed: Oct. 18, 1999

(51) Int. Cl.⁷ .......................... B29C 33/20; B29C 41/04
(52) U.S. Cl. ...................... 425/451.9; 425/434; 425/435; 425/450.1; 264/297.6; 264/297.8; 264/311
(58) Field of Search .................... 425/434, 435, 425/450.1, 451.9; 264/297.6, 297.8, 302, 311, 312

(56) References Cited

U.S. PATENT DOCUMENTS

| | | | |
|---|---|---|---|
| 2,298,507 | 10/1942 | Kelm | 425/451.9 |
| 3,293,698 | 12/1966 | Bavers | 425/434 |
| 3,546,747 | 12/1970 | Stefaniak et al. | 425/186 |
| 3,611,506 | 10/1971 | Schroeder | 425/434 |
| 3,801,255 | 4/1974 | Meyer et al. | 425/434 |
| 4,043,737 | 8/1977 | Greenberg | 425/434 |
| 4,350,481 | 9/1982 | Corea et al. | 425/73 |
| 4,472,127 | 9/1984 | Cyriax et al. | 425/183 |
| 4,473,346 | 9/1984 | Hehl | 425/183 |
| 4,832,590 | 5/1989 | Bellmer | 425/185 |
| 4,929,166 | 5/1990 | DiSimone et al. | 425/190 |
| 5,094,608 | 3/1992 | Piazza et al. | 425/434 |
| 5,277,861 | 1/1994 | Zilbert | 264/255 |
| 5,306,564 | 4/1994 | Guzikowski | 425/408 |
| 5,529,481 | 6/1996 | Guzikowski | 425/434 |
| 5,869,109 | 2/1999 | Guzikowski | 425/451.9 |

Primary Examiner—Nam Nguyen
Assistant Examiner—Donald Heckenberg
(74) Attorney, Agent, or Firm—Quarles & Brady LLP (57) ABSTRACT

A molding apparatus is disclosed which includes a first support having spaced apart vertical posts, and a first set of mold halves positioned between the vertical posts. A second support is provided having positioned thereon a second set of mold halves. A clamp bar is positioned on the vertical posts adjacent the second support so as to extend across the mold halves of the second set of mold halves. A grip member secured to the first support is movable between an engage and disengage position, wherein in the engage position a clamp engages the grip member and the clamp bar so as to drive the respective sets of mold halves into sealing contact with each other, so as to form two mold cavities. In the disengage position, the grip member is clear of the clamp so as to permit the clamp to also act as a device to separate the supports when the molding process is over. Methods of using this equipment in an automated rotational molding process are also disclosed.

13 Claims, 9 Drawing Sheets

ROTATIONAL MOLD AUTOMATED CLAMPING SYSTEM

CROSS-REFERENCE TO RELATED APPLICATION

Not applicable.

STATEMENT REGARDING FEDERALLY SPONSORED RESEARCH

Not applicable.

BACKGROUND OF THE INVENTION

This invention relates to rotational molding systems in which there are multiple mold halves that are repetitively opened and closed. More particularly, it relates to a system for automatically opening, closing, clamping, and unclamping such molds.

Various types of rotational molding systems are well known. For example, U.S. Pat. No. 5,306,564 and 5,529,481 describe mold systems where two or more pairs of mold halves can simultaneously be brought together to form mold cavities in which molded items are cast.

Meltable particulate (usually a plastic such as polyethylene) is placed inside each cavity, each mold is closed and placed in a furnace where it is heated (or the molds are otherwise heated), and each mold is rotated and sometimes also rocked.

The particulate melts and adheres to the internal surface of each cavity. After cooling, each mold is opened and the molded items are removed. This type of molding is particularly well suited for items that have large hollows in them (e.g. large plastic toys; plastic gasoline containers).

In high production facilities problems can arise in connection with the opening and closing of such molds. As taught in U.S. Pat. No. 5,529,481, a system is needed to hold the mold halves tightly together during the molding process. This is particularly important because of the range of movement of the molds during molding, and because if the mold halves are not tightly held together plastic can seep into the joint between mold halves, thereby creating unwanted flashing (and wasting plastic).

To achieve a tight joint the art had previously used various bolting systems. However, such bolting systems were labor intensive and time consuming to use. In some cases, workers experienced repetitive strain injuries due to the need for repetitive turning of bolts and/or nuts.

Moreover, if the bolts/nuts were not evenly tightened there could be uneven wear at the mold joint and/or instances of seepage at the joint. While patents such as U.S. Pat. No. 5,306,564 disclosed a system to reduce the number of bolts required, that system still required some bolts. Even with that system there was some concern regarding achieving even clamping pressure on opposite sides of the molds, and when comparing one mold pair to another.

In U.S. Pat. No. 5,869,109 a system was provided to simultaneously clamp and unclamp a pair of molds. While this system was a significant improvement, it still required manual clamping and locking of the molds.

It can therefore be seen that a need exists for an improved multi-mold closure system that reduces still further the manual operations of the molding process.

BRIEF SUMMARY OF THE INVENTION

In one aspect the invention provides a molding apparatus which includes a first support having spaced apart vertical posts and a first set of mold halves positioned between the vertical posts. There is also a second support having positioned thereon a second set of mold halves, and a clamp bar positioned on the vertical posts adjacent the second support extends across the mold halves of the second set of mold halves. A movable grip member secured to the first support is movable between an engage and disengage position, wherein in the engage position a clamp engages the grip member and the clamp bar so as to drive the respective sets of mold halves into sealing contact with each other. In the disengage position, the grip member is clear of the clamp.

The apparatus can include a spring that biases the movable grip member towards the either engage or disengage position. The grip member can include a vertical grip post having a recess therein for engaging a clamp, the grip post being slidable relative to the first support. The grip post can be slidably mounted to a base, the base being rigidly mounted to the first support.

In other aspects, the grip member can include a guide for guiding a member which slidably moves the vertical post. There can also be a clamp suitable to provide clamping pressure between the grip member and clamp bar where the clamp includes a tongue for engaging the grip member.

In still other aspects, the clamp can include a ram which urges the clamp bar towards the grip member, and the clamp includes a lift arm for lifting the second support. The clamp includes an actuator for locking and unlocking a clamp bar locking means.

In still other preferred forms, the clamp is mounted to a frame for horizontal and vertical movement, there is an actuating mechanism for slidably moving the grip member between the engage and disengage positions, and the grip member is interposed between the vertical posts.

In a different form the invention provides methods of molding parts using the above apparatus. In an automated manner, one can with the apparatus clamp the sets of mold halves together, mold parts in the mold halves, unclamp the mold halves, and then separate the mold halves.

It will be appreciated that the present invention provides a system which permits the clamping member to also serve as a lifting member for lifting the mold halves apart. Still other objects and advantages of the present invention will become apparent from examination of the preferred embodiment and claims which follow.

DETAILED DESCRIPTION OF THE INVENTION

Figure 1:
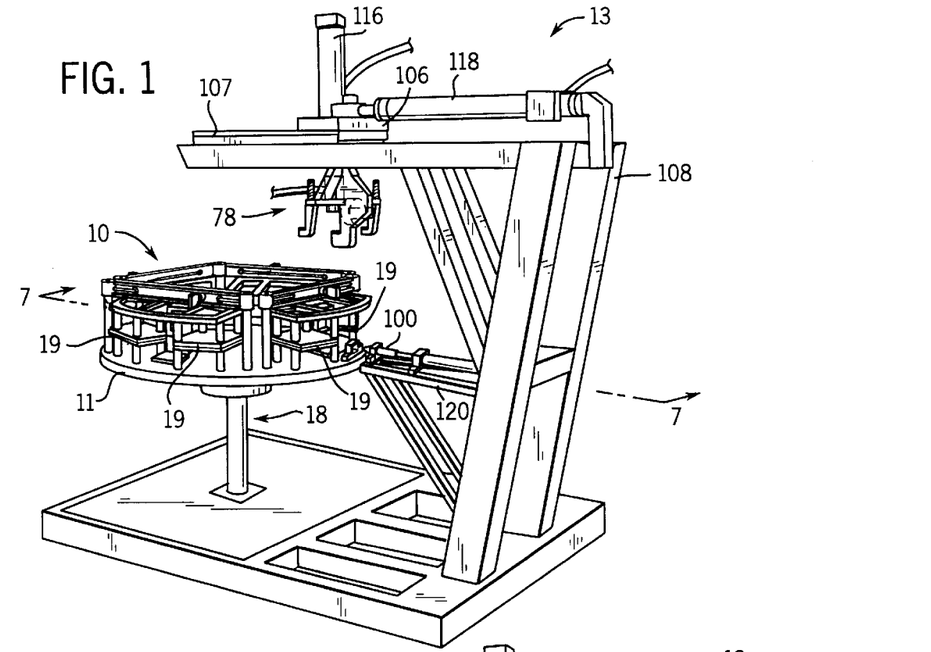
FIG. 1 is a perspective view of molding apparatus in accordance with the present invention.
Figure 2:
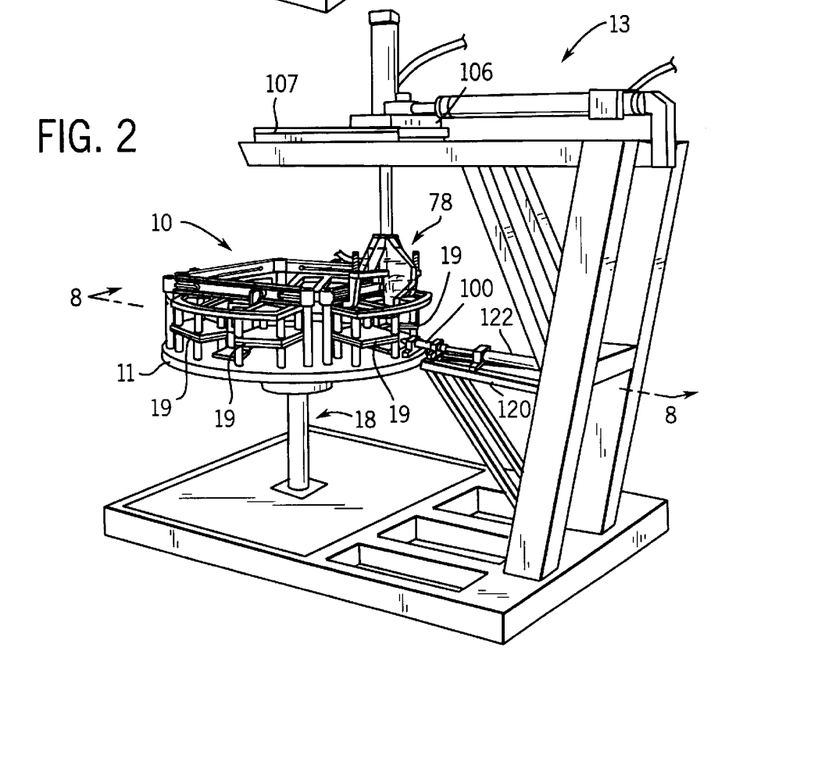
FIG. 2 is another perspective view of the molding apparatus of FIG. 1, albeit with the clamping apparatus in operation.

FIGS. 1 and 2 show a molding apparatus (generally 10) incorporating the present invention. The molding apparatus 10 includes a clamping apparatus 13, and a circular spider platform 11 which is connectable to a conventional rotational molding mechanism 18 using methods known in the art. The spider platform 11 supports a plurality of molds 19 mounted thereon. The molding mechanism 10 rotates and rocks the spider platform 11 (and thus the molds 19).

Figure 3:
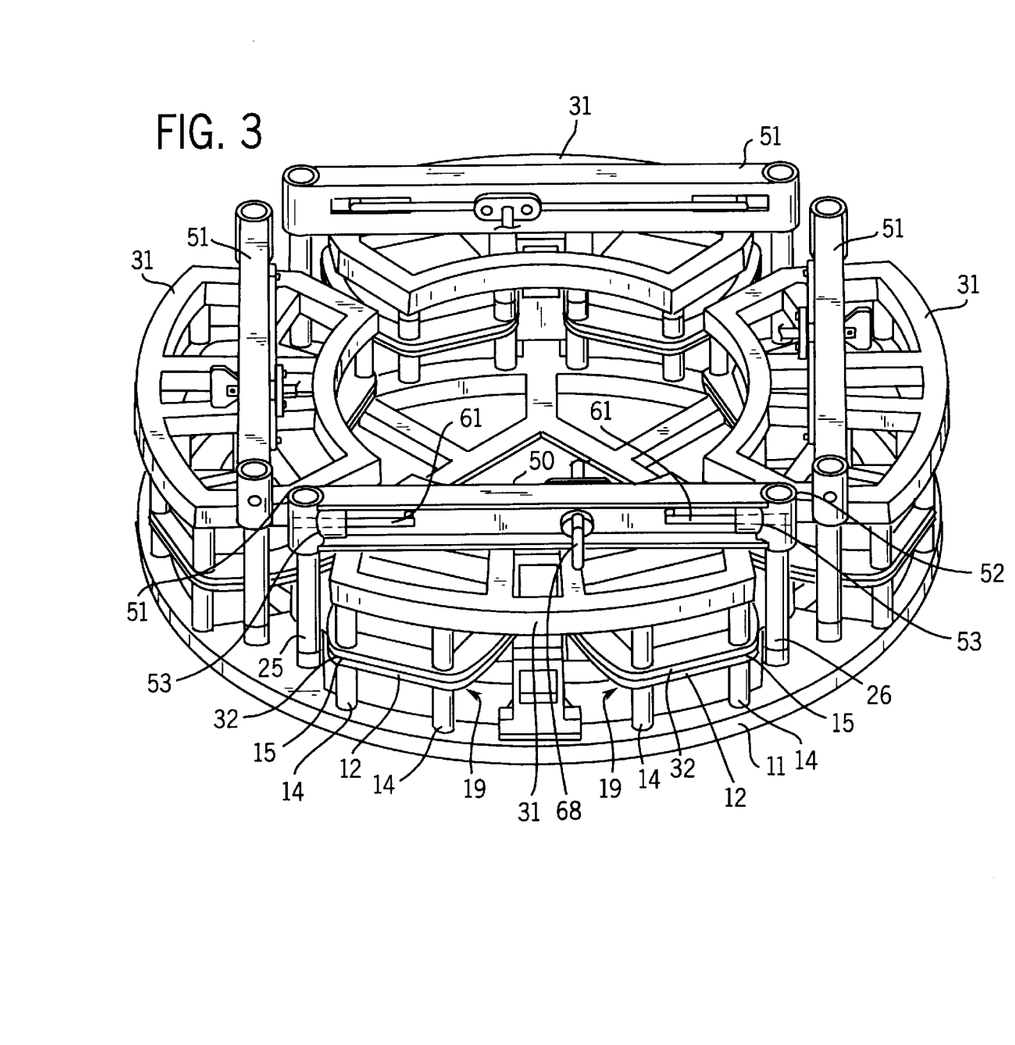
FIG. 3 is an enlarged perspective view of the molds on the spider platform of FIG. 1, albeit without the clamp system shown.

Referring to FIG. 3, each mold 19 includes top and bottom mold halves. Each bottom mold half 12 is supported by the generally circular spider platform 11, and includes an internal cavity(not shown), leg supports 14, and a sealing edge 15. The mold bottom halves 12 are permanently attached to the spider platform 11 by known techniques (e.g. welding; bolting).

Figure 3A:
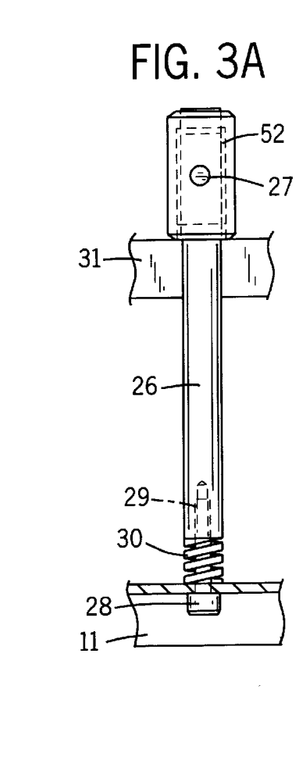
FIG. 3A is a detailed view of a vertical post of the assembly adjacent a mold bottom half of FIG. 3.

Pairs of mold bottom halves 12 are interposed between posts 25, 26 connected to the spider platform 11. The vertical posts 25 and 26 are positioned on opposed lateral sides of each pair of mold bottom halves 12. Each post 25, 26 has a horizontal hole 27 through it, and (as shown in FIG. 3A) is connected at its lower end to the spider platform 11 by a bolt 28 passing into a threaded bore 29 in the bottom of the post. A spring 30 is positioned around the bolt 28 which permits the vertical post 25, 26 to move gently vertically against spring pressure, depending on the amount of downward force on the vertical post 25, 26.

Figure 4:
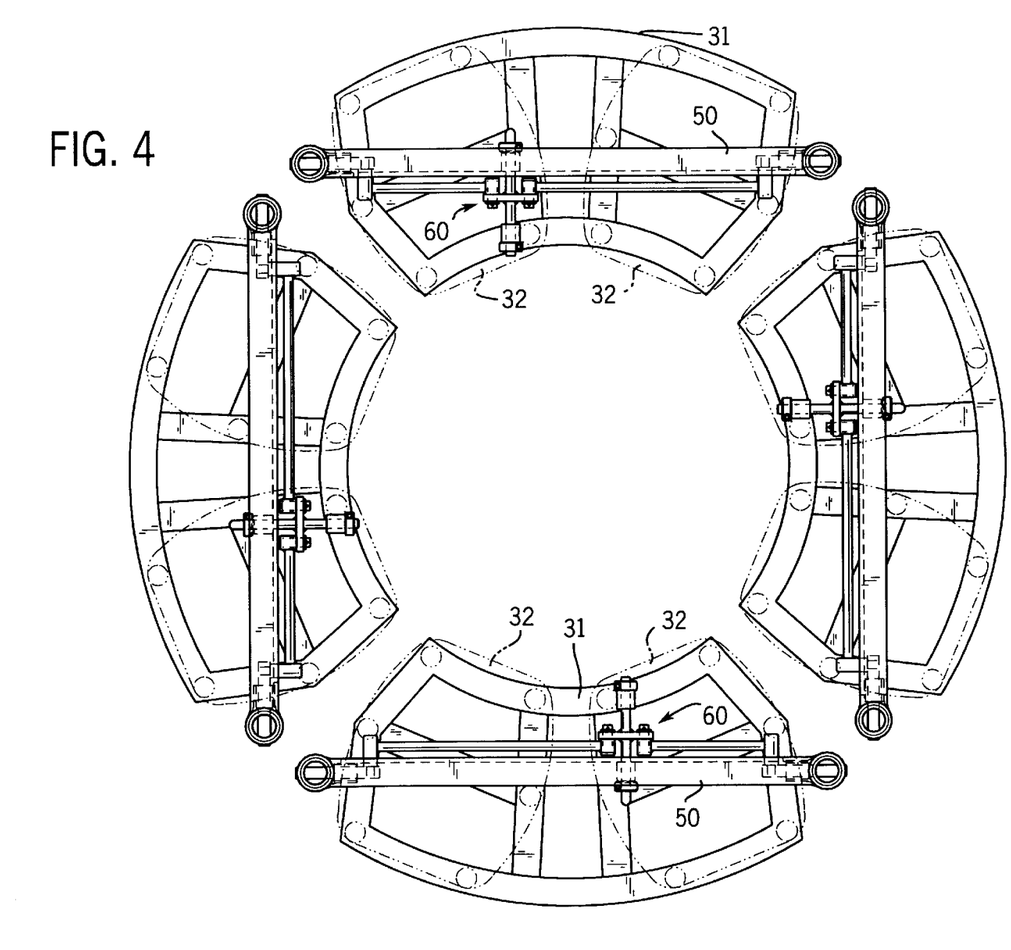
FIG. 4 is a top view of the spider of FIG. 3 (again without the clamping mechanism shown)

Referring to FIGS. 3 and 4, a second support 31 is provided which has mounted thereon two mold top halves 32, in a spaced apart fashion. The mold top halves 32 are similar in construction to the mold bottom halves 12 in that they also have four legs, an internal cavity and a sealing edge. When the support 31 and mold top halves 32 are aligned over the mold bottom halves 12, all the mold halves form internal mold cavities (see generally the alignment shown in FIG. 4). Mold top halves 32 are preferably attached to the second support 31 via shock absorbing type connection (such as with springs) similar to the vertical post shock absorbing assembly (28-30).

The top and bottom mold halves are held together by a clamp bar 50 adjacent the second support 31 so as to extend across both the mold top halves 32 mounted thereon. The clamp bar 50 has cylindrical structures 51/52 at its ends that are suitable to fit over and ride on the tops of vertical posts 25 and 26. The internal portion of the clamp bar is preferably hollow, with the downward edge of the clamp bar being optionally open. As shown in FIG. 3A, cylindrical structure 51 and 52 have a hole 53 that is alignable with the corresponding holes 27 on the vertical posts.

Locking means 60 are provided to interfit with the holes 53 and lock the molds together. As will be best appreciated by examining FIGS. 9A, 9B, the locking means 60 is designed to move pins 61 into the corresponding holes 53/27 in the clamp bar and vertical posts. In the position shown in FIG. 9B, pins 61 are in the unlocked position, where downward movement of the clamp bar (e.g. in response to a hydraulic clamp) can cause movement of the vertical post 26 down against spring pressure.

Note that the vertical posts 25, 26 guide the movement of the clamp bar so as to provide even pressure along each sealing joint as clamping takes place. When this occurs, the pins can be moved to the FIG. 9A position. The clamp bar 50 then holds the mold halves tightly together and the hydraulic clamp is no longer needed. To separate the mold halves, one must decouple the clamp bar 50 from the vertical posts 25, 26. This can be achieved by causing the pins to move out of the locking position back to the FIG. 9B position.

Figure 9A:
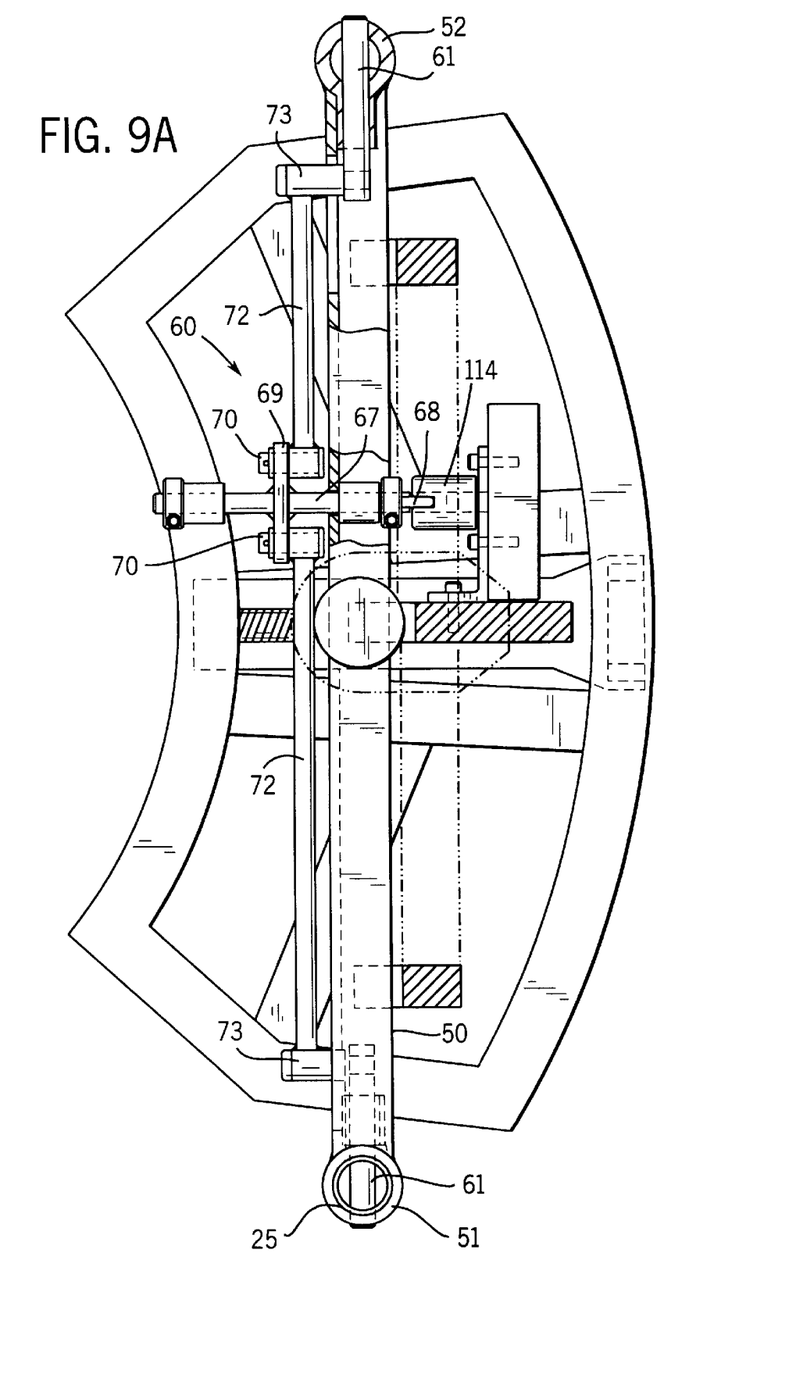
FIG. 9A is sectional view along line 9A–9A of FIG. 8A.
Figure 9B:
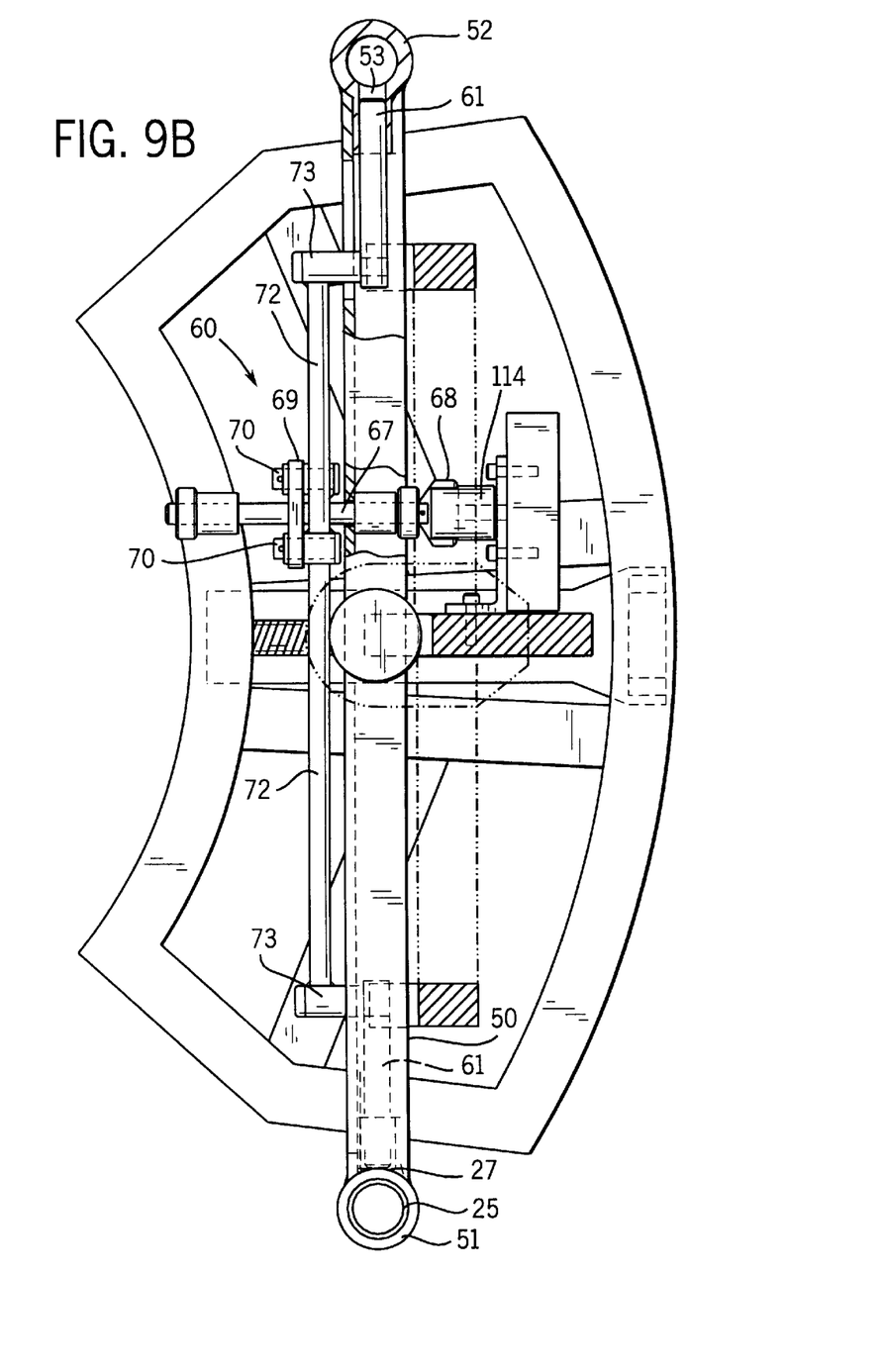
FIG. 9B is a view of FIG. 9A when the locking mechanism is in an unlocked position.

A preferred locking means 60 is shown in detail in FIGS. 9A, 9B. A pivot bar 67 is linked to a socket 68, whereby rotating of the socket 68 rotates the pivot bar 67. The pivot bar 67 is also linked to a coupler 69 for rotational movement therewith. The coupler retains two pintles 70 that can rotate in holes in the coupler ends. Rotation of the coupler will cause linked bars 72 to be moved between the FIG. 1 position and the FIG. 9B position. There is another rotational linkage 73 between bars 72 and pins 61. When the socket 68 is in the FIG. 9A position, the system is locked. When the socket 68 is in the FIG. 9B position, the system is not locked.

Figure 8:
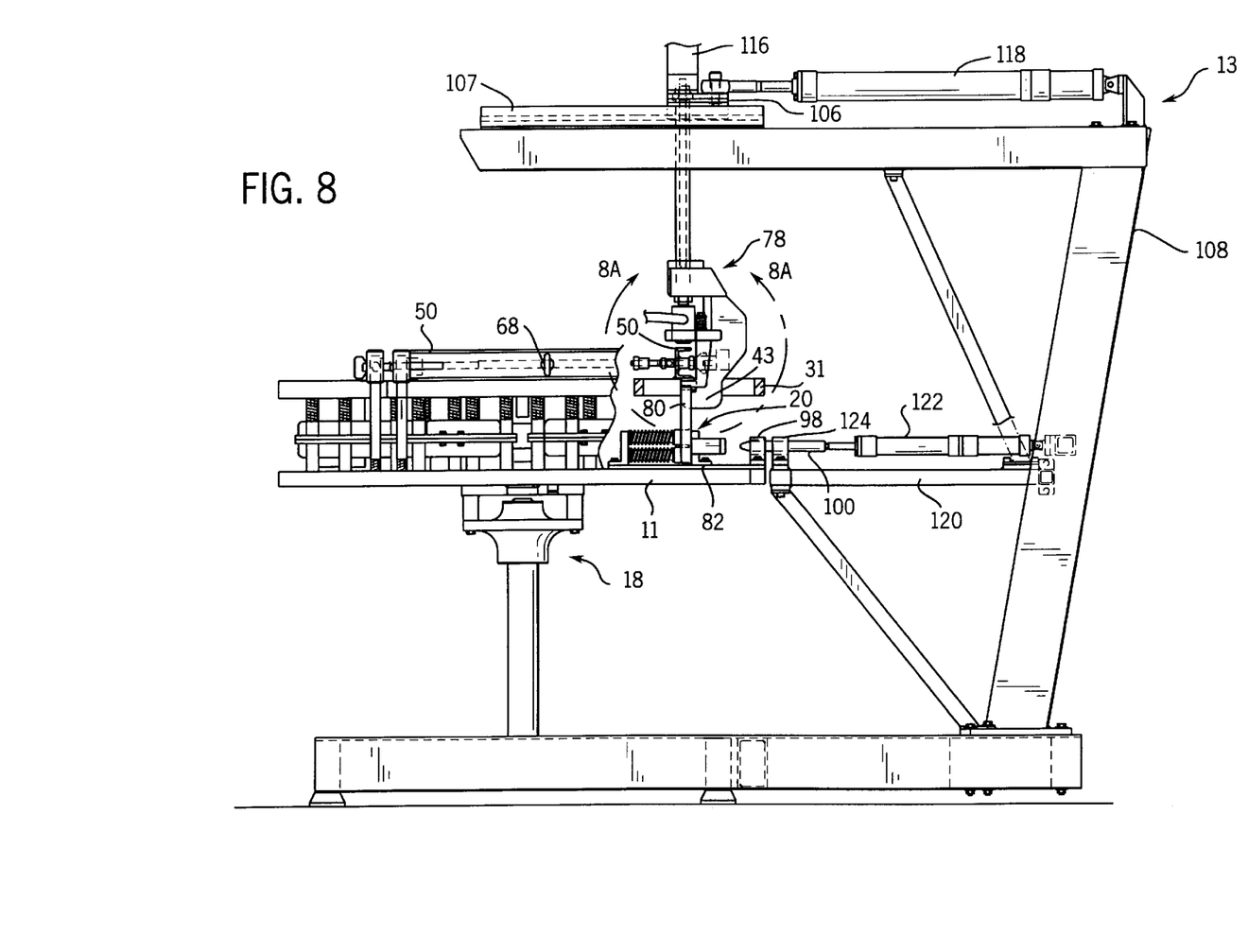
FIG. 8 is a cut away sectional view along line 8—8 of FIG. 2 (the clamped position)

Referring to FIG. 8, to urge the top and bottom mold halves together for locking the clamp bar 50, a clamp 78 engages a grip member 20 secured to the spider platform 11. The grip member 20 is interposed between the mold bottom halves of a pair, and includes a grip post 80 radially slidably mounted to an elongated, substantially flat base 82 mounted to the spider platform 11.

Figure 5:
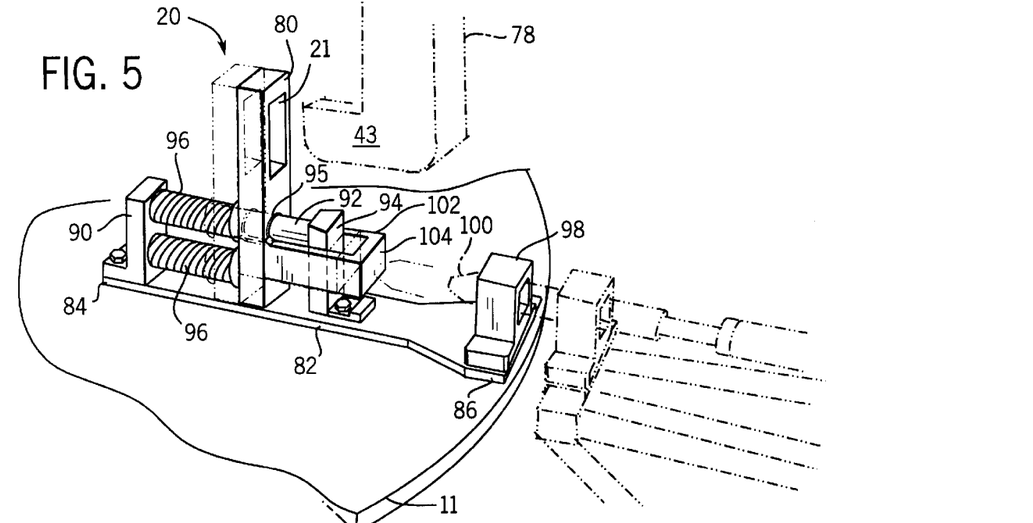
FIG. 5 is a detailed perspective view of a grip member of FIG. 1.

Looking at FIG. 5, the base 82 has an inner and outer end 84, 86 substantially aligned with a radial extending through a center of the circular spider platform 11. A first stop 90 mounted to the inner platform end 84 supports each end of a pair of guide bars 92, and a second stop 94 mounted between the inner and outer base ends 84, 86 supports the other end of the guide bars 92. Although a base is preferred to simplify assembly and alignment, the stops 90, 94 can be mounted directly to the spider platform 11 without departing from the scope of the invention.

The guide bars 92 extend through apertures 95 formed in the grip post 80 to slidably mount the grip post 80 to the base 82, and guide the grip post 80 between an engage position and a disengage position (phantom lines in FIG. 8). Biasing springs 96 are positioned around each bar 92 to urge the grip post 80 toward the engage position abutting the second stop 94. In the engage position, the grip post 80 is positioned for engagement with the clamp 78. A guide 98 mounted to the base outer end 86 aligns a plunger 100 with the grip post 80 which urges the grip post 80 toward the disengage position. In the disengage position, the grip post 80 remains clear of the clamp 78 preventing engagement therewith.

The grip post 80 has at its upper end a rectangular hole 21 below a top edge 22 for engagement with the clamp 78. The grip post 80, also at its lower end, has a U-shaped member 102 for engagement with the plunger 100. The U-shaped member 102 extends from the grip post 80, and wraps around the second stop 94 to expose a pushing surface 104 for engagement with the plunger 100.

Figure 6:
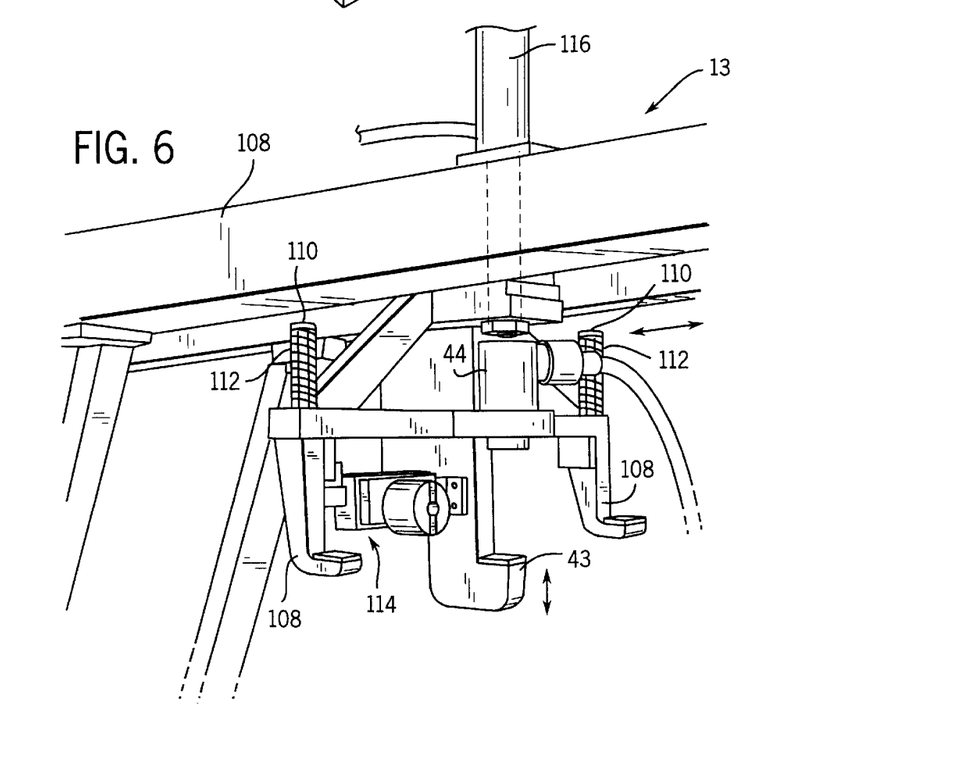
FIG. 6 is a detailed perspective view of the clamping apparatus of FIG. 1.
Figure 7:
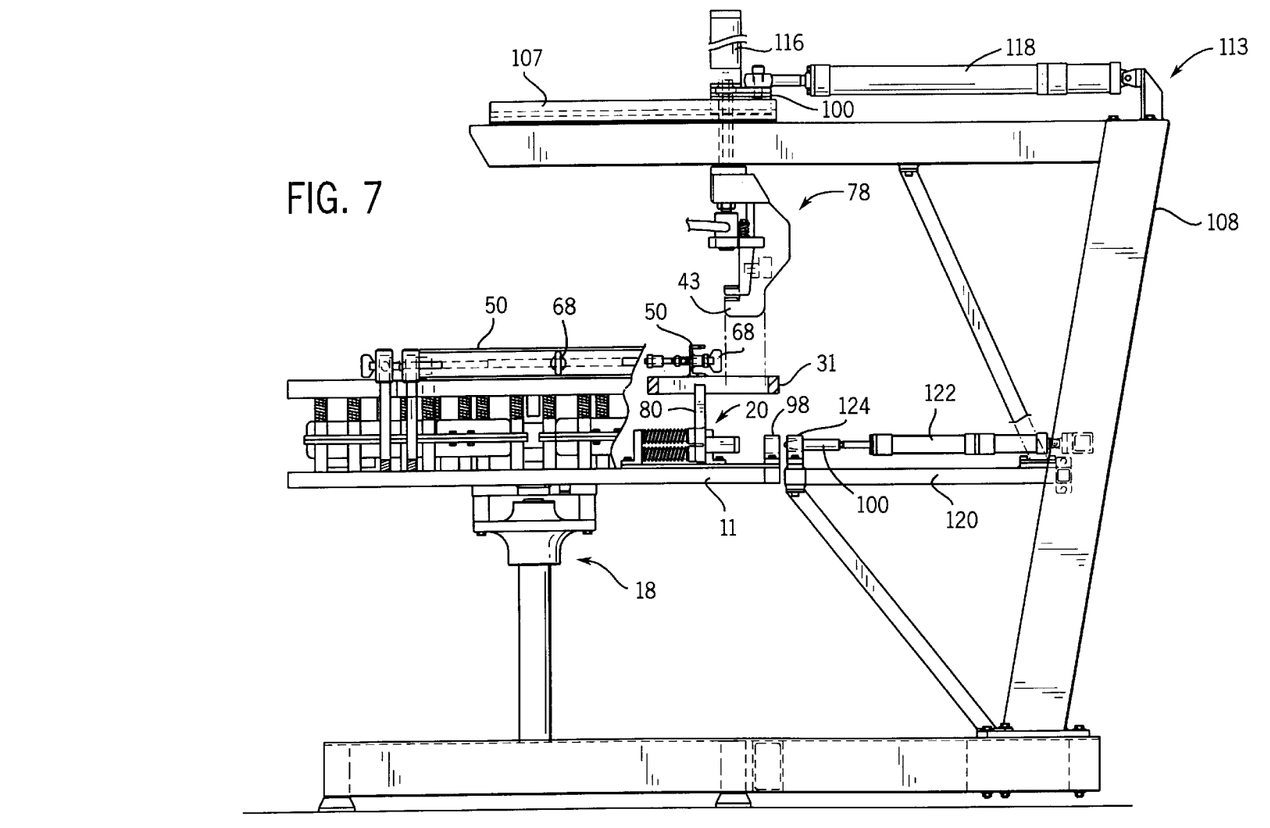
FIG. 7 is a cut away sectional view along line 7—7 of FIG. 1 (the unclamped position)

Referring now to FIG. 6, the clamping apparatus 13 has the vertically movable clamp 78 suspended from a carriage 106 slidably mounted to a frame 108. The clamp 78 engages the grip member 20 and clamp bar 50 to urge the mold halves 12, 32 together with a centrally disposed lower tongue 43, and a centrally disposed hydraulic ram 44. The tongue 43 fits into the grip post rectangular hole 21 when the grip post 20 is in the engage position The ram 44 engages an upper surface of the clamp bar 50, and when energized, urges the clamp bar 50 toward the lower tongue 43, squeezing the upper and lower mold halves together.

Lift arms 108 spaced from both sides of the lower tongue 43 and ram 44 engage a lower surface of the clamp bar 50 when separating the mold upper and lower halves. When separating the molds, the ram 44 is energized to urge the clamp bar lower surface against the lift arms 108, securing the clamp bar 50 between the ram 44 and lift arms 108. The clamp 78 is then raised away from the spider platform 11 to lift the top molds away from the bottom molds.

The lift arms 108 are vertically, slidably mounted to the clamp 78 by posts 110 extending through apertures (not shown) formed in the clamp 78. The slidable movement of the lift arms 108 prevent the ram 44 from crushing the clamp bar 55 between the ram 44 and lift arms 108. Springs 112 surrounding the posts 110 exert a force counteracting the ram 44 to maintain the clamp bar 50 between the ram 44 and lift arms 108.

Figures 8A, 8B, 8C, 10:
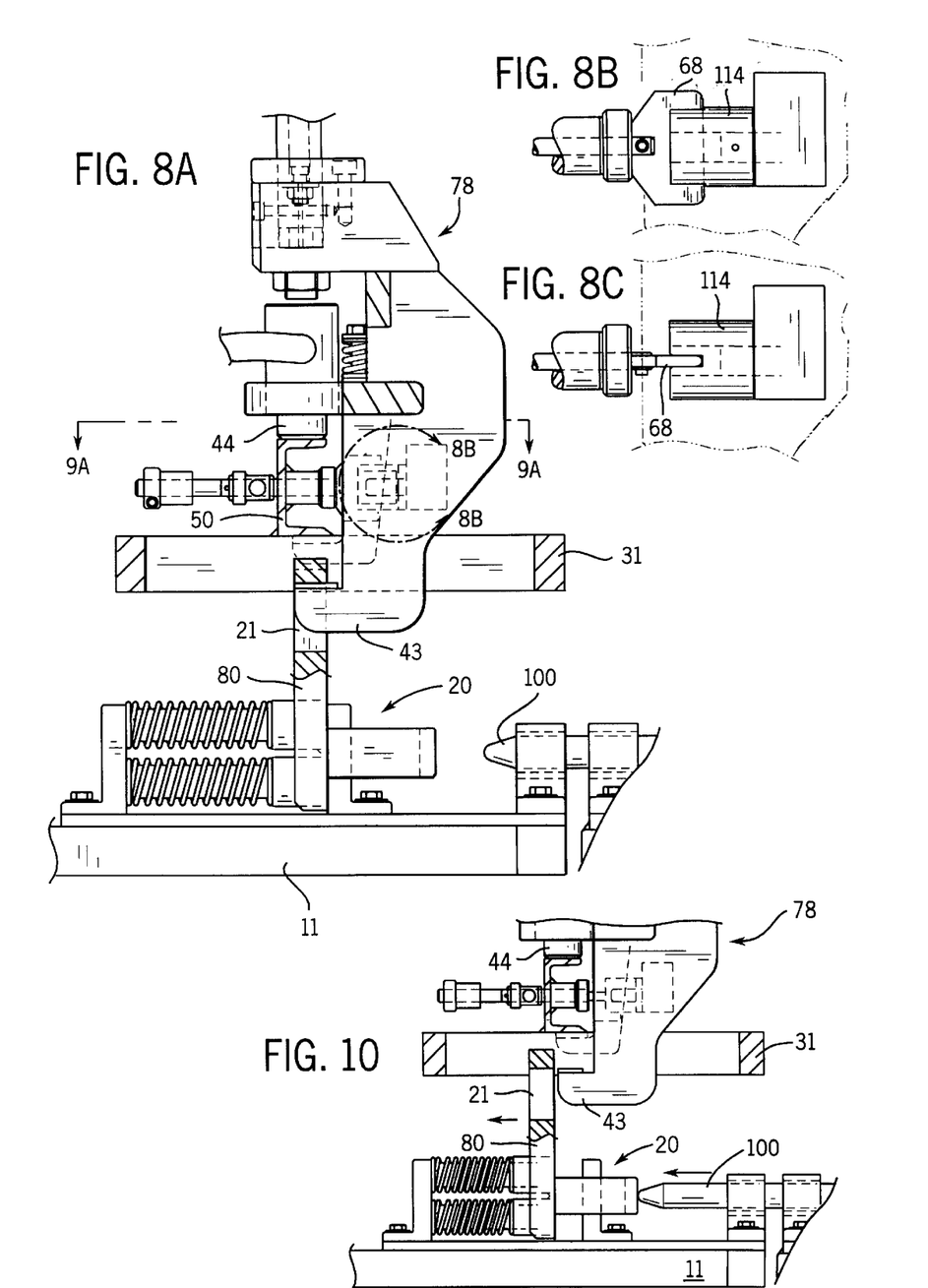
FIG. 8A is a detailed view along line 8A—8A of FIG. 8.
FIG. 8B is a detailed view along line 8B—8B of FIG. 8A.
FIG. 8C is a detailed view of 8B when the socket is rotated.
FIG. 10 is an elevational view of the grip member in a disengage position.

An actuator 114 mounted between the clamp tongue 43 and one of the lift arms 108 is adapted for engaging the rotating socket 68 when the clamp 78 is engaged with the clamp bar 50. As shown in FIGS. 8B, 8C, the actuator 114 rotates the socket 68 to lock and unlock the clamp bar locking mechanism.

Referring now to FIGS. 1, 2, 7, and 8, the clamp 78 is slidably mounted on the carriage 106 for vertical movement. A pneumatic cylinder 116 rigidly mounted to the carriage 106 moves the clamp 78 in the desired direction. Similarly, the carriage 106 is slidably mounted on a track 107 for horizontal movement. The track 107 is rigidly mounted to the frame 108. A cylinder 118 rigidly mounted to the frame 108 moves the carriage 106, and thus the clamp 78, in the desired direction along the track 107. Looking at FIGS. 7, 8, and 10, the clamping apparatus frame 108 also supports the plunger 100 on a support arm 120 which aligns with the grip member guide 98. The plunger 100 is slidably moved between an extended position, a partially extended position, and a retracted position by a cylinder 122 rigidly mounted to the frame 108. A guide 124 mounted to the support arm 120 guides the plunger 100 toward the grip member guide 98 to provide proper alignment of the plunger 100 with the grip member 20. The plunger 100 remains in the retracted position (shown in FIG. 7), when the spider platform is in motion. When clamping the mold halves together, the plunger 100 remains in the partially extended position (shown in FIG. 8) through both guides 98, 124 to prevent movement of the spider platform 11 while remaining clear of the grip member 20. When the clamp 78 is separating the mold halves (shown in FIG. 10), the plunger 100 extends through the guides in its extended position to engage the grip member 20, and urge the grip post 80 toward the grip member disengage position away from the clamp tongue 43.

In operation, a meltable plastic particulate is inserted in each open mold cavity. The plunger 100 is then partially extended to prevent rotation of the spider platform 11. The second support 31, with its two open upper mold halves 32, is then positioned as shown in FIG. 3. The clamp bar 50 is then positioned as shown in FIG. 3. At this point, holes 53 on the clamp bar 50 are somewhat higher than holes 27 on the vertical posts 25, 26.

The hydraulic clamp 78 can then be positioned as shown in FIG. 8A, with the grip post 80 in the engage position, the lower clamp tongue 43 inserted in the rectangular hole 21, and the clamp ram 44 positioned on top of the clamp bar 51. By activating the hydraulic ram 44, the clamp bar 50 is urged downwards towards the spider platform 11, against spring pressure. This then causes a tight mold seal between all of the mold halves in their respective pairs, and permits an alignment of the respective holes 53, 27 on the clamp bar 50 and the vertical posts 25, 26.

At this point, the socket 68 can then be rotated by the clamp actuator 114 to the FIGS. 8B and 9A position, thereby driving the locking pins into the vertical posts. The clamp 78 can then be removed, the plunger 100 fully retracted, and the spider platform 11 can be used for rotational molding in the usual fashion.

When the molding is completed, the pair of molds being released are aligned with the plunger 100, and the plunger cylinder 122 is actuated to extend the plunger 100 to the extended position through the guides 98, 124. As shown in FIG. 10, the plunger 100 engages the pushing surface 104 of the grip post 80, and urges the grip post 80 toward the disengage position. The clamp 78 is then moved vertically and horizontally to slip the lift arms 108 underneath the clamp bar 50, and the actuator 114 in engagement with the locking mechanism socket 68. The clamp ram 44 is actuated to grasp the clamp bar 50 between the ram 44 and lift arms 108, and then the actuator 114 rotates the socket 68 to unlock the lock arm 51 as shown in FIGS. 8A and 9B. Once the lock arm 50 is unlocked, the clamp 78 moves vertically to separate the mold top halves 32 from the mold bottom halves 12.

It will be appreciated from the discussion above that minimal user interaction is required when using this system. For example, automated control of the cylinders 116, 117, 122, and clamp ram 44, such as by a computer, allows automatic clamping and unclamping of the molds without user intervention.

What has been described above is the preferred embodiment of the present invention. Other embodiments are also within the intended scope of the claims. For example, cylinders moving the clamp carriage and clamp can be hydraulic, or servo motor mechanism incorporating a rack and pinion. Additionally, the grip post can be rotated away from the clamp, as opposed to slidably moving the grip post. As such, the claims which follow should be looked to in order to judge the full scope of the invention.

INDUSTRIAL APPLICABILITY

The present invention is useful in automating molding. In particular it provides an apparatus for permitting a single device to both clamp molds together and lift them apart.

I claim:

1. A molding apparatus, comprising:
   a first support having spaced apart vertical posts and a first set of mold halves positioned between said vertical posts;
   a second support having positioned thereon a second set of mold halves;
   a clamp bar positionable on the vertical posts adjacent to the second support so as to extend across at least one of said mold halves of said second set of mold halves, the clamp bar having means for riding along the vertical posts; and
   a movable grip member secured to said first support, said grip member being movable between an engage and disengage position, wherein in said engage position a clamp can engage said grip member and said clamp bar so as to drive the respective sets of mold halves into sealing contact with each other, and in said disengage position, said grip member is clear of said clamp.

2. The molding apparatus of claim 1, further comprising a spring biasing said movable grip member towards either the engage or disengage position.

3. The molding apparatus of claim 1, in which the grip member has a vertical grip post with a recess therein for engaging the clamp, said grip post being slidable relative to said first support.

4. A molding apparatus, comprising:
   a first support having spaced apart vertical posts and a first set of mold halves positioned between said vertical posts;
   a second support having positioned thereon a second set of mold halves;
   a clamp bar positionable on the vertical posts adjacent to the second support so as to extend across both said mold halves of said second set of mold halves, the clamp bar having means for riding along the vertical posts; and
   a movable grip member secured to said first support, said grip member being movable between an engage and disengage position, wherein in said engage position a clamp can engage said grip member and said clamp bar so as to drive the respective sets of mold halves into sealing contact with each other, and in said disengage position, said grip member is clear of said clamp, wherein said grip member has a vertical grip post with a recess therein for engaging the clamp, said grip post being slidable relative to said first support and slidably mounted to a base, said base being rigidly mounted to said first support.

5. The molding apparatus of claim 3, in which the grip member includes a guide for guiding a member which slidably moves said vertical grip post.

6. The molding apparatus of claim 1, further comprising the clamp which is suitable to provide clamping pressure between said grip member and clamp bar.

7. The molding apparatus of claim 6, in which the clamp includes a tongue for engaging said grip member.

8. A molding apparatus, comprising:
   a first support having spaced apart vertical posts and a first set of mold halves positioned between said vertical posts;
   a second support having positioned thereon a second set of mold halves;
   a clamp bar positionable on the vertical posts adjacent to the second support so as to extend across both said mold halves of said second set of mold halves, the clamp bar having means for riding along the vertical posts;
   a movable grip member secured to said first support, said grip member being movable between an engage and disengage position,
   a clamp suitable to provide clamping pressure between the grip member and clamp bar, wherein the clamp has a ram which can urge said clamp bar toward said grip member, wherein in said movable grip member engage position said clamp can engage said grip member and said clamp bar so as to drive the respective sets of mold halves into sealing contact with each other, and in said movable grip member disengage position, said grip member is clear of said clamp.

9. The molding apparatus of claim 6, in which the clamp is linked to a lift arm for automated lifting of said second support.

10. The molding apparatus of claim 6, in which said clamp has an actuator for locking and unlocking a clamp bar locking means.

11. The molding apparatus of claim 6, in which said clamp is mounted to a frame for horizontal and vertical movement.

12. The molding apparatus of claim 1, further comprising an actuating mechanism for slidably moving said grip member between said engage and disengage positions.

13. The molding apparatus of claim 1, in which said grip member is interposed between said vertical posts.

* * * * *